Feb. 18, 1947. G. H. MITCHELL 2,416,195
TIRE PRESS
Filed July 18, 1942 2 Sheets-Sheet 2
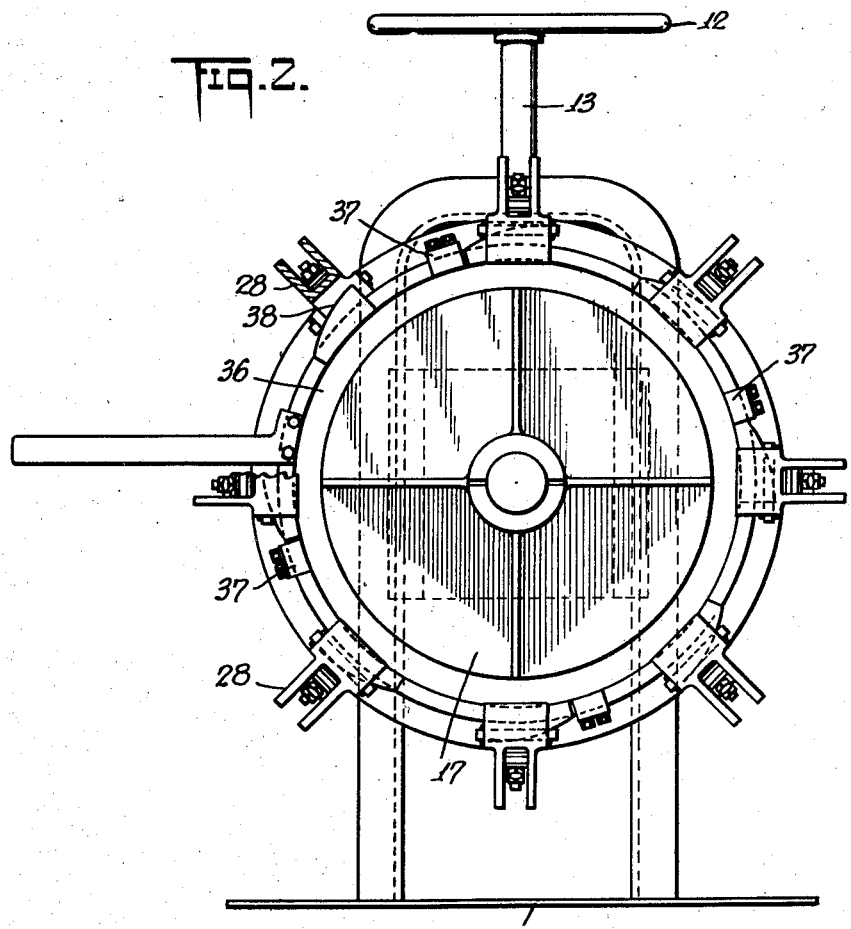
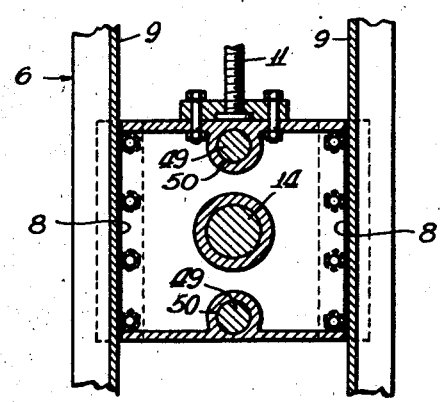
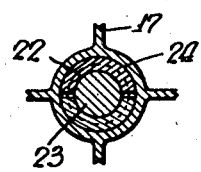
INVENTOR
George H. Mitchell Patented Feb. 18, 1947

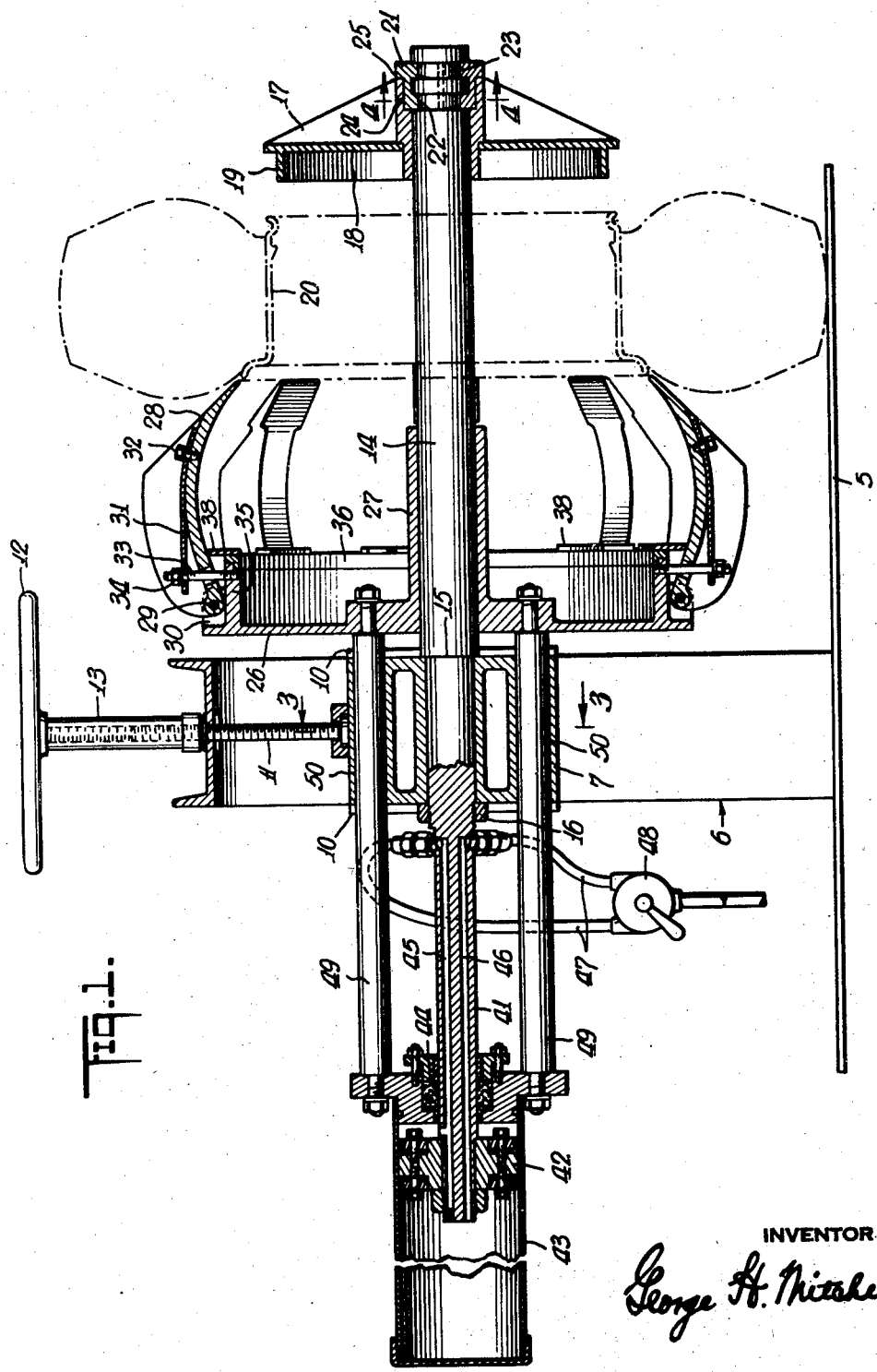

2,416,195

UNITED STATES PATENT OFFICE 2,416,195

TIRE PRESS

George H. Mitchell, New York, N. Y.

Application July 18, 1942, Serial No. 451,520

2 Claims. (Cl. 157—6)

My invention relates to a tire press for removing tires from rims.

It is well known that tires, particularly heavy truck and bus tires, often become rusted or bound tightly to the rim and that the removal of a tire from a rim by the usual methods is a time consuming and laborious operation. Furthermore, the tires or tubes, or both, are sometimes injured during the process of removal.

It is an object of my invention to provide an improved form of tire press which will overcome some of the drawbacks heretofore encountered in connection with prior art tire presses.

It is a more specific object to provide an improved form of tire press in which the tire and rim are readily mounted and which will operate smoothly and relatively noiselessly.

Another object is to provide an improved form of tire press, which is simple in construction, exceedingly sturdy, and reliable in operation.

Briefly stated, in a preferred form of the invention, I employ a fixed stem for carrying a rim head. A stripper head carrying stripper means such as fingers is mounted for bodily movement toward and from the rim head and is preferably guided on the fixed stem. The stripper head is moved by suitable means, preferably hydraulic piston and cylinder means, so as to provide for relatively powerful, smooth, and readily controlled action. In the preferred form the tire stripper assembly is movable as a unit to various positions of adjustment so as to readily adapt the tire press to tires of different sizes without the necessity of bodily lifting tires and rims.

In the drawings which show, for illustrative purposes only, a preferred form of the invention—

Fig. 1 is a central, vertical, sectional view through a tire press, illustrative of the invention;

Fig. 2 is a right-hand view in elevation of the tire press shown in Fig. 1;

Fig. 3 is a sectional view, taken substantially in the plane of the line 3—3 of Fig. 1;

Fig. 4 is a sectional view, taken substantially in the plane of the line 4—4 of Fig. 1.

In that form of the invention herein specifically disclosed, I may employ a base or floor 5 carrying an upstanding frame 6 thereon. The frame preferably supports the operating parts of the press. The frame acts as a support for a carrier 7 which, in the form shown, has flat slideways 8—8 for coaction with the inner guideways 9—9 on the sides of the frame 6. The frame is preferably formed of channel or other strong members so as to support the press assembly. Guide strips or plates 10—10 at opposite sides of the frame 6 serve to hold the carrier 7 against displacement from the frame.

In order to adjust the carrier, and with it the other parts of the tire press, I may employ a screw 11, non-rotatably carried by the carrier 7 and projecting through the top of the frame 6. A hand wheel 12 having a long, threaded boss or stem 13 is engaged with the screw 11 so that when the hand wheel is turned the carrier may be adjusted up and down to take care of tires of various sizes, as will be clearly understood.

The carrier 7 has a guide stem 14 fixedly mounted thereon. The guide stem may have a shoulder 15 to abut the carrier at one side, and a nut 16 may be threaded on the stem at the opposite side of the carrier so as to rigidly and securely clamp the stem to the carrier. The stem 14 preferably at the end carries a rim head 17, which may be in the form of a webbed plate 18 having a projecting flange 19 to pilot the rim 20 of a tire and position the edge thereof against the plate 18. The rim head is preferably removably mounted on the stem 14 and it may be held thereon as by means of a two-part collar 21, which has circumferential flanges 22 fitting into grooves 23 in the stem. The rim head may have a counterbore 24 at the end to fit over a part of the collar and hold the two parts thereof in engagement with the stem 14 and the collar preferably has an abutment shoulder 25 to be engaged by the outer end of the rim head.

A stripper head 26 is mounted for bodily movement toward and from the rim head. The stripper head 26 may consist of a disk or plate and when the stripper head is to be slidably mounted on the stem 14, as in the preferred form, the stripper head may have a long bearing sleeve 27 to slidably fit over the stem 14, whereby the stripper head will be guided effectively on the stem and the stripper means will remain in perfect concentricity with the rim head. The stripper head carries stripper means, which in the form shown consists of a plurality of stripper fingers 28 pivotally mounted at 29 between ears 30 on a part of the stripper head. The stripper fingers 28 in the preferred form are urged radially inwardly, as by means of flat plate springs 31 secured to the fingers as by means of a cap screw 32. The springs 31 extend rearwardly and a bolt 33 having an adjustable head 34 may extend through the spring and be secured to the annular flange 35 on the stripper head. Normally, all of the fingers will be positioned radially inwardly under the influence of the springs 31. Means for moving the fingers radially outwardly may take various forms; for example, a cam ring 36 may be rotatably secured to the end of the flange 35 as by means of angle brackets 37, and the cam ring may carry cams 38 which are so formed and positioned as to engage beneath the fingers when the cam ring is rotated. The cam ring may be provided with a handle 40 for oscillating the same so as to shift the cams 38 for moving the fingers radially outwardly against the springs 31, as will be understood.

The stripper head is moved toward the rim head by means preferably in the form of hydraulic piston and cylinder means. In the form illustrated, the stem 14 carries a rear projection or piston rod 41, which carries a fixed piston 42 at the rear end thereof. A cylinder 43 receives the piston 42 and the piston rod 41 extends through suitable packing and stuffing box means 44, as will be understood. Pressure fluid is conducted to and from the cylinder at opposite sides of the piston 42 in suitable fashion; for example, the rod 41 may be provided with longitudinally extending bores 45—46 which open into the cylinder at opposite sides of the piston 42. Pressure piping 47 serves to connect the bores 45—46 to a four-way valve 48, which is in turn connected to a source of pressure fluid and to exhaust.

The cylinder 43 is rigidly connected to the stripper head, as by means of a plurality of connecting rods 49—49, which latter preferably extend through guide bores 50—50 in the carrier 7 and thus serve as further guiding supports for the stripper head during its reciprocating movement.

The operation of the device is as follows:

The rim head may be moved toward the left and the two-part collar 21 removed from the shaft, after which the rim head itself may be slipped off the end of the shaft. A tire and rim, as shown in dot-dash lines in Fig. 1, may then be rolled into place, of course without the necessity of lifting the tire and rim from the floor, and the rim head then replaced on the stem 14, the two-part collar put back in place, and the rim head moved toward the right to secure the collar in place, as heretofore described. If the size of the tire is such that the rim head 19 is not concentric with the rim 20 of the tire, the handwheel 12 may be actuated so as to raise or lower the entire assembly so that the rim head will fit into the rim without the necessity for manual lifting of the tire. The cam ring actuator 40 is then moved so as to cause the cams 38 to position the fingers just outside of the rim and in position to engage the tire side walls. Thereafter, the valve 48 may be shifted so as to allow pressure fluid to enter the passage 45 and pass into the cylinder 43 at the right-hand side of the piston 42. The fluid pressure will then force the cylinder and, through the connecting rods 49, the stripper head toward the right, and if the rim is not already on the rim head, the fingers will force the rim thereon, and thereafter the stripper fingers will cam themselves down into the space between the rim and the tire walls and will also be urged inwardly by the springs 31 (the cam ring 36 having meanwhile been rotated so as to remove the cams 38 from beneath the stripper fingers). Further movement of the stripper head will break the tire loose from the rim and gently force it completely off of the rim. Since the rim is held relatively stationary, there will be no substantial jar or noise when the tire finally breaks loose or passes entirely from the rim. When hydraulic pressure is employed, the hydraulic fluid in the cylinder 43 will have more or less of a dashpot action so as to prevent very rapid movements when the resistance decreases. Therefore, the tire will not be forcibly projected from the rim and since the rim is held stationary on the rim head, it will not be projected therefrom and fall in among the fingers as might be the case if the rim head instead of the stripper head were the moving member.

After the tire has been stripped from the rim, the valve 48 may be shifted so as to return the cylinder and with it the stripper head to the position shown in Fig. 1. The rim head may then be removed and the rim from which the tire has just been stripped may then be taken off of the rim head and the foregoing procedure followed with the next tire.

It will thus be seen that I have provided an exceedingly simple, sturdy machine for removing tires from rims. It is to be understood that, while the adjustable feature including the handwheel 12 is a great convenience, the broader features of the invention are not limited to any adjustable means.

Certain features disclosed herein are shown and claimed in application of Plumeau and Ottoson, Serial No. 451,518, filed July 18, 1942.

While the invention has been described in considerable detail and a preferred form shown, it is to be understood that various changes may be made within the scope of the invention as defined in the appended claims.

I claim:

1. In a tire stripper, a fixed central stem, a cross head carrying said stem, a rim head removably carried by the end of said fixed central stem, a stripper head having a central guide passage fitting said stem and guided thereby for longitudinal sliding movement thereon, tire stripper means carried by said stripper head for engagement with a tire, a plurality of actuating bars passing through and guided by said cross head and secured to said stripper head for actuating the latter, and fluid pressure actuated means located in rear of said cross head and connected to said plurality of actuating bars for actuating the latter to move said stripper head longitudinally on said fixed central stem, for the purpose set forth.

2. In a tire stripper, a frame, a cross head mounted thereon, a fixed central guide stem on said cross head, a stripper head having tire stripping means and a rim head for engagement with a tire rim, one of said last mentioned heads being fixedly but removably secured to said central guide stem and the other of said two last mentioned heads having a central guide opening slidably fitting said fixed stem for sliding movement thereon, a plurality of actuating bars passing through said cross head and parallel to said central stem and secured to said head having said central guide opening slidably fitting said stem, and means in rear of said cross head for moving said actuating bars to move said head secured thereto longitudinally on said fixed stem.

GEORGE H. MITCHELL.

REFERENCES CITED

The following references are of record in the file of this patent:

UNITED STATES PATENTS

| Number | Name | Date |
| --- | --- | --- |
| 1,352,722 | Caldwell | Sept. 14, 1920 |
| 2,228,086 | Rodgers | Jan. 7, 1941 |
| 1,724,813 | Weaver et al | Aug. 13, 1929 |
| 1,170,612 | Covey | Feb. 8, 1916 |
| 1,964,119 | Hendry | June 26, 1934 |
| 1,879,331 | Kulp et al | Sept. 27, 1932 |
| 870,039 | Lease | Nov. 5, 1907 |
| 887,973 | Smith et al | May 19, 1908 |
| 1,641,083 | Hite | Aug. 30, 1927 |